United States Patent
Ananthapur Bache et al.

(10) Patent No.: US 10,986,422 B2
(45) Date of Patent: Apr. 20, 2021

(54) HYPER VIDEO NAVIGATION

(71) Applicant: INTERNATIONAL BUSINESS MACHINES CORPORATION, Armonk, NY (US)

(72) Inventors: Vijay Kumar Ananthapur Bache, Bangalore (IN); Vijay Ekambaram, Chennai (IN); Bidhu R. Sahoo, Bangalore (IN); Arvind Kumar, Bangalore (IN); Padmanabha Venkatagiri Seshadri, Mysore (IN)

(73) Assignee: International Business Machines Corporation, Armonk, NY (US)

( * ) Notice: Subject to any disclaimer, the term of this patent is extended or adjusted under 35 U.S.C. 154(b) by 9 days.

(21) Appl. No.: 16/196,031

(22) Filed: Nov. 20, 2018

(65) Prior Publication Data
US 2020/0162800 A1 May 21, 2020

(51) Int. Cl.
H04N 21/858 (2011.01)
G06F 40/30 (2020.01)
G06N 20/00 (2019.01)
G06F 3/01 (2006.01)
G06F 40/284 (2020.01)

(52) U.S. Cl.
CPC ......... *H04N 21/8583* (2013.01); *G06F 3/017* (2013.01); *G06F 40/284* (2020.01); *G06F 40/30* (2020.01); *G06N 20/00* (2019.01)

(58) Field of Classification Search
None
See application file for complete search history.

(56) References Cited

U.S. PATENT DOCUMENTS

| | | | |
|---|---|---|---|
| 5,966,121 A * | 10/1999 | Hubbell | H04N 21/435 375/E7.024 |
| 6,546,555 B1 * | 4/2003 | Hjelsvold | H04N 21/21 348/E5.008 |
| 6,912,726 B1 * | 6/2005 | Chen | H04N 5/44543 725/113 |

(Continued)

OTHER PUBLICATIONS

Brooks, Daniel J., Cameron Finucane, Adam Norton, Constantine Lignos, Vasumathi Raman, Hadas Kress-Gazit, Mikhail S. Medvedev et al. "Situation understanding bot through language and environment." In Human-Robot Interaction (HRI), 2012 7th ACM/IEEE International Conference on, pp. 419-419. IEEE, 2012.

(Continued)

*Primary Examiner* — Henry Orr
(74) *Attorney, Agent, or Firm* — Schmeiser, Olsen & Watts; Nicholas Bowman

(57) ABSTRACT

A method and system for improving a hyper-video navigational process is provided. The method includes automatically tracking user exploration paths of users within a hyper video space comprising a video stream. Hotspot video frames are extracted from the hyper video space. Conversations associated with the user interactions are linked with spatial temporal regions of the hotspot video frames. Common attributes of the user exploration paths are associated with common aspects of the conversations and specified user view personas of the video stream are detected. Visual trajectory paths are extracted and a particular user persona is assigned to the hyper video space. In response, the hyper video space is automatically navigated.

20 Claims, 11 Drawing Sheets

(56) References Cited

U.S. PATENT DOCUMENTS

| | | | |
|---|---|---|---|
| 7,356,830 B1* | 4/2008 | Dimitrova | G06K 9/00758 |
| | | | 725/51 |
| 7,818,329 B2* | 10/2010 | Campbell | G06F 16/48 |
| | | | 707/755 |
| 8,271,487 B1* | 9/2012 | Hermush | H04N 5/4401 |
| | | | 707/734 |
| 8,352,873 B2 | 1/2013 | Craig | |
| 8,460,099 B2 | 6/2013 | Barclay | |
| 8,666,993 B2 | 3/2014 | Chunilal | |
| 9,003,306 B2 | 4/2015 | Mehin | |
| 9,244,923 B2* | 1/2016 | Cooper | G06F 16/94 |
| 9,639,634 B1* | 5/2017 | Greene | H04N 21/47217 |
| 10,104,403 B1 | 10/2018 | Ekambaram | |
| 10,250,953 B1* | 4/2019 | Murali | H04N 21/4408 |
| 2002/0059094 A1* | 5/2002 | Hosea | H04N 21/25891 |
| | | | 725/10 |
| 2007/0070069 A1* | 3/2007 | Samarasekera | G06F 3/011 |
| | | | 345/427 |
| 2009/0007023 A1* | 1/2009 | Sundstrom | G06F 3/0481 |
| | | | 715/858 |
| 2009/0077459 A1* | 3/2009 | Morris | H04N 21/4312 |
| | | | 715/201 |
| 2009/0077503 A1* | 3/2009 | Sundstrom | G06F 3/04842 |
| | | | 715/856 |
| 2010/0064220 A1* | 3/2010 | Sankaranarayan | |
| | | | H04N 21/8586 |
| | | | 715/719 |
| 2010/0274674 A1* | 10/2010 | Roberts | G06Q 30/0277 |
| | | | 705/14.73 |
| 2011/0113334 A1* | 5/2011 | Joy | G06F 16/4393 |
| | | | 715/716 |
| 2012/0260263 A1 | 10/2012 | Edoja | |
| 2014/0040273 A1* | 2/2014 | Cooper | G06F 16/41 |
| | | | 707/741 |
| 2016/0057092 A1 | 2/2016 | Liao | |
| 2016/0179293 A1* | 6/2016 | Girgensohn | H04N 5/765 |
| | | | 715/719 |
| 2017/0034112 A1 | 2/2017 | Perlegos | |
| 2018/0294014 A1 | 10/2018 | Ekambaram | |
| 2018/0302656 A1 | 10/2018 | Ekambaram | |
| 2019/0200082 A1* | 6/2019 | Murali | H04N 21/4725 |

OTHER PUBLICATIONS

Li, Yehao, Ting Yao, Rui Hu, Tao Mei, and Yong Rui. "Video ChatBot: Triggering Live Social Interactions by Automatic Video Commenting." In Proceedings of the 2016 ACM on Multimedia Conference, pp. 757-758. ACM, 2016.

Pan, Yingwei, Tao Mei, Ting Yao, Houqiang Li, and Yong Rui. "Jointly modeling embedding and translation to bridge video and language." arXiv preprint arXiv:1505.01861 (2015).

Romain, Naike; Announcing Wistia's 360 Video Player and 360 Heatmaps; May 3, 2016; https://wistia.com/learn/product-updates/360-video-player-and-heatmaps; 17 pages.

Ye, Guangnan, Yitong Li, Hongliang Xu, Dong Liu, and Shih-Fu Chang. "Eventnet: A large scale structured concept library for complex event detection in video." In Proceedings of the 23rd ACM international conference on Multimedia, pp. 471-480. ACM, 2015.

* cited by examiner

HYPER VIDEO NAVIGATION

FIELD

The present invention relates generally to a method for tracking hyper video space and in particular to a method and associated system for improving video technology associated with extracting hot spot video frames, assigning viewing attributes to the hyper video space, and automatically navigating the hyper video space.

BACKGROUND

Accurately tracking video files typically includes an inaccurate process with little flexibility. Modifying and navigating video space may include a complicated process that may be time consuming and require a large amount of resources. Accordingly, there exists a need in the art to overcome at least some of the deficiencies and limitations described herein above.

SUMMARY

A first aspect of the invention provides a hyper-video navigational improvement method comprising: a plurality of user exploration paths of a plurality of users within a hyper video space comprising a video stream; extracting, by the processor from the hyper video space, hotspot video frames, of the video stream, based on user interactions of the plurality of users with the hyper video space; linking, by the processor, conversations associated with the user interactions with spatial temporal regions of the hotspot video frames; associating, by the processor, common attributes of the user exploration paths with common aspects of the conversations; detecting, by the processor and based on the associations between the common attributes and the common aspects, a plurality of specified user view personas of users of the video stream with respect to the hotspot video frames; extracting, by the processor, visual trajectory paths for each specified user view persona of the plurality of specified user view personas, wherein each specified user view persona is associated with a group of hotspot video frames of the hotspot video frames; automatically assigning, by the processor, a particular specified user view persona of the plurality of specified user view personas to a particular user of the hyper video space; and automatically navigating, by the processor based on results of the automatically assigning, the hyper video space for the particular user.

A second aspect of the invention provides a computer program product, comprising a computer readable hardware storage device storing a computer readable program code, the computer readable program code comprising an algorithm that when executed by a processor of a hardware device implements a hyper-video navigational improvement method, the method comprising: automatically tracking, by the processor, a plurality of user exploration paths of a plurality of users within a hyper video space comprising a video stream; extracting, by the processor from the hyper video space, hotspot video frames, of the video stream, based on user interactions of the plurality of users with the hyper video space; linking, by the processor, conversations associated with the user interactions with spatial temporal regions of the hotspot video frames; associating, by the processor, common attributes of the user exploration paths with common aspects of the conversations; detecting, by the processor and based on the associations between the common attributes and the common aspects, a plurality of specified user view personas of users of the video stream with respect to the hotspot video frames; extracting, by the processor, visual trajectory paths for each specified user view persona of the plurality of specified user view personas, wherein each specified user view persona is associated with a group of hotspot video frames of the hotspot video frames; automatically assigning, by the processor, a particular specified user view persona of the plurality of specified user view personas to a particular user of the hyper video space; and automatically navigating, by the processor based on results of the automatically assigning, the hyper video space for the particular user.

A third aspect of the invention provides a hardware device comprising a processor coupled to a computer-readable memory unit, the memory unit comprising instructions that when executed by the computer processor implements a hyper-video navigational improvement method comprising: automatically tracking, by the processor, a plurality of user exploration paths of a plurality of users within a hyper video space comprising a video stream; extracting, by the processor from the hyper video space, hotspot video frames, of the video stream, based on user interactions of the plurality of users with the hyper video space; linking, by the processor, conversations associated with the user interactions with spatial temporal regions of the hotspot video frames; associating, by the processor, common attributes of the user exploration paths with common aspects of the conversations; detecting, by the processor and based on the associations between the common attributes and the common aspects, a plurality of specified user view personas of users of the video stream with respect to the hotspot video frames; extracting, by the processor, visual trajectory paths for each specified user view persona of the plurality of specified user view personas, wherein each specified user view persona is associated with a group of hotspot video frames of the hotspot video frames; automatically assigning, by the processor, a particular specified user view persona of the plurality of specified user view personas to a particular user of the hyper video space; and automatically navigating, by the processor based on results of the automatically assigning, the hyper video space for the particular user.

The present invention advantageously provides a simple method and associated system capable of accurately tracking video files.

DETAILED DESCRIPTION

Figure 1:
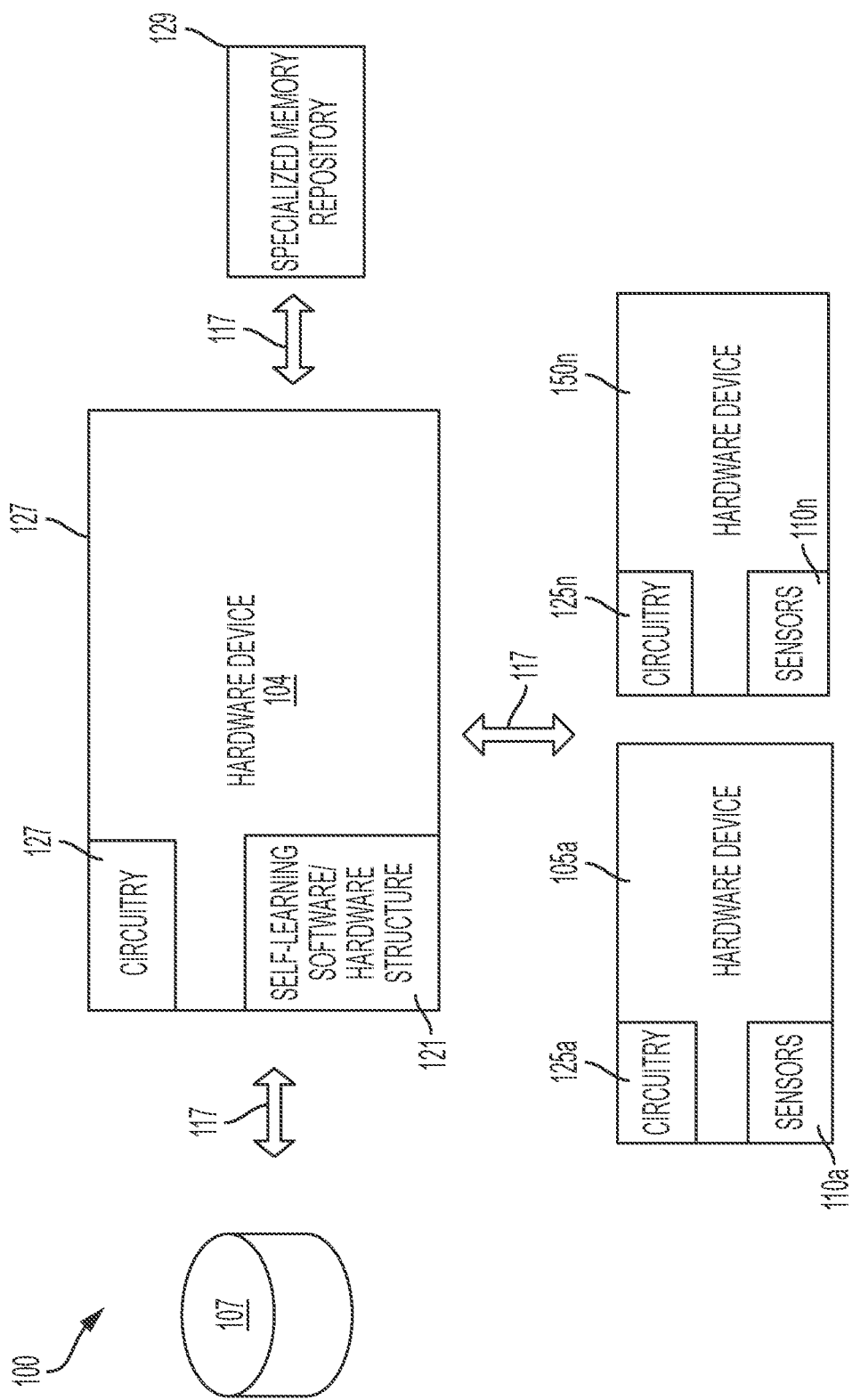
FIG. 1 illustrates a system for improving video technology associated with extracting hot spot video frames, assigning viewing attributes to the hyper video space, and automatically navigating the hyper video space, in accordance with embodiments of the present invention.

FIG. 1 illustrates a system 100 for improving video technology associated with extracting hot spot video frames, assigning viewing attributes to the hyper video space, and automatically navigating the hyper video space, in accordance with embodiments of the present invention. System 100 enables a machine learning hyper video software/hardware system for generating a user persona based automated navigation of hyper videos by automatically discovering semantic textual tags associated with video hotspots and correlating basic descriptive semantics extracted from hotspot video frames with comments of multiple users engaged with the video hotspots. System 100 enables the following functionality:

1. Graphical user interface implemented click to navigate functionality within a video space using conversational modality by tracking user exploration paths within a hyper video space and extracting video hotspots based on specified user engagements.
2. Extracting descriptive video-based semantics with respect to user exploration paths and organizing the descriptive video-based semantics into a hierarchy of concepts with respect to associated video files.
3. Linking user conversations from comments (within the hyper video space) to various spatial-temporal regions of the hyper video space by matching concepts within the hierarchy of concepts with the semantics of user comments.

System 100 enables a system and method providing the following features:

1. Tracking user exploration paths within a hyper video space.
2. Extracting descriptive semantics within the exploration paths.
3. Linking relevant conversational elements preceding and succeeding the hyper video sharing event to various spatial-temporal regions of the video space.

System 100 of FIG. 1 includes a hardware device 104 (i.e., specialized hardware device), hardware devices 105a . . . 105n (i.e., specialized hardware device), a specialized memory repository 129, and a database 107 (e.g., a cloud-based system) interconnected through a network 117. Hardware device 104 includes specialized circuitry 127 (that may include specialized software), and self-learning software code/hardware structure 121 (i.e., including self-learning software code). Hardware devices 105a . . . 105n may include personal devices provided to each individual. Hardware devices 105a . . . 105n include specialized circuitry 125a . . . 125n (that may include specialized software) and sensors 110a . . . 110n. Sensors 110a . . . 110n may include any type of sensor (or biometric sensor) including, inter alia, a heart rate monitor, a blood pressure monitor, a temperature sensor, a pulse rate monitor, an ultrasonic sensor, an optical sensor, a video retrieval device, an audio retrieval device, humidity sensors, a voltage sensor, social media sensors, etc. Hardware device 104, hardware devices 105a . . . 105n, and database 107 may each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server hardware device 104, hardware devices 105 . . . 105n, and database 107 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-5. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for improving video technology associated with extracting hot spot video frames, assigning viewing attributes to the hyper video space, and automatically navigating the hyper video space. Network 117 may include any type of network including, inter alia, a local area network, (LAN), a wide area network (WAN), the Internet, a wireless network, etc. Alternatively, network 117 may include an application programming interface (API).

System 100 comprises a machine learning system for automated navigation of hyper videos via the following implementation functionality:

Automatically discovering semantic textual tags of video hotspots within hyper video files (e.g., 360-degree videos) by correlating basic descriptive semantics extracted from hotspot video frames with user comments submitted by users engaged with the video hotspots. Additionally, system 100 correlates commonalities within the user exploration path with common discussion aspects from the user comments to derive finer tuned video links for improved semantic textual tags. Therefore, system 100 enables click to navigate functionality within the video space using the conversational modality via execution of the following steps:

1. Tracking user exploration paths within the hyper video space and extracting hotspots based on user engagements.
2. Extracting descriptive semantics along the paths and organizing descriptions into a hierarchy of concepts with respect to the video space.
3. Linking user conversations from comments (associated with the video) to various spatial-temporal regions of the video space (e.g., Hotspots) by matching concepts in a description hierarchy with the semantics of user comments. The linking process is further improved by correlating the commonalities in user exploration path with the common discussion aspects from associated user comments.

Additionally, system 100 retrieves suitable and appropriate user view personas for a hyper video file with respect to associated viewable trajectory paths within the video file such that suitable view personas (e.g., techy, fun, sports, etc.) are detected by extracting top themes from user conversations linked to the video hotspots. Likewise, trajectory paths for every persona (covering all hotspots related to a theme associated with the persona) are extracted such that when any user opens a hyper-video, he/she is presented with a suggestion as to what persona he/she needs to assign them for automated navigation within the hyper video.

Figure 2:
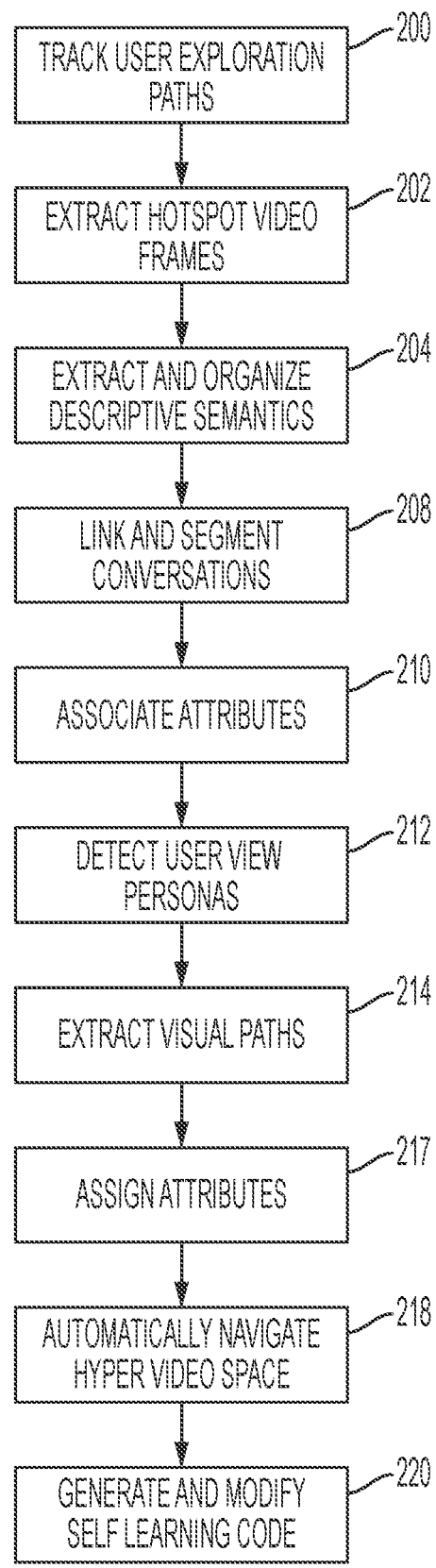
FIG. 2 illustrates an algorithm detailing a process flow enabled by the system of FIG. 1 for improving video technology associated with extracting hot spot video frames, assigning viewing attributes to the hyper video space, and automatically navigating the hyper video space, in accordance with embodiments of the present invention.

FIG. 2 illustrates an algorithm detailing a process flow enabled by system 100 of FIG. 1 for improving video technology associated with extracting hot spot video frames, assigning viewing attributes to the hyper video space, and automatically navigating the hyper video space, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by hardware device 104 and hardware devices 105a . . . 105n. In step 200, user exploration paths (of a user) are tracked within a hyper video space comprising a video stream. The user exploration paths (for a plurality of users) may be generated by determining a distance and orientation of movement of the user within the hyper video space with respect to a starting position of the video stream. In step 202, hotspot video frames of the video stream are extracted from the hyper video space based on the user interactions with the hyper video space. The user interactions include device movement gestures and input/output events with respect to the hyper video space. Hotspot video frames may be tagged with specified video stream topics.

In optional step 204, descriptive semantics (associated with the hotspot video frames) are extracted from the user exploration paths. Additionally, the descriptive semantics are organized with respect to a hierarchy of concepts with respect to the video stream. Extracting the descriptive semantics may include: sampling, video frames of the hyper video space; and tokenizing the conversations for topic identification. The hierarchy of concepts may be linked with the conversations such that links are generated for automatically rendering a specified video segment of the video stream. Alternatively, the hierarchy of concepts may be linked with the conversations such that links are generated for automatically rendering multiple specified video segments of the video stream.

In step 208, conversations associated with the user interactions are linked to spatial temporal regions of the hotspot video frames. The conversations may be segmented with respect to the descriptive semantics. In step 210, common attributes of the user exploration paths are associated with common aspects of the conversations. In step 212, specified user view personas of users of the video stream are detected (based on results of step 210) with respect to the hotspot video frames. In step 214, visual trajectory paths are extracted for each specified user view persona. Each specified user view persona is associated with a group of hotspot video frames of the hotspot video frames. In step 217, a specified user view persona is automatically assigned to a specific user based on results of step 214. In step 218, the hyper video space is automatically navigated based on results of step 217. In step 220, self-learning software code for executing future hyper video navigational processes may be generated based on results of step 218. The self-learning software code may be modified based on said results of executing the future hyper video navigational processes.

Figure 3:
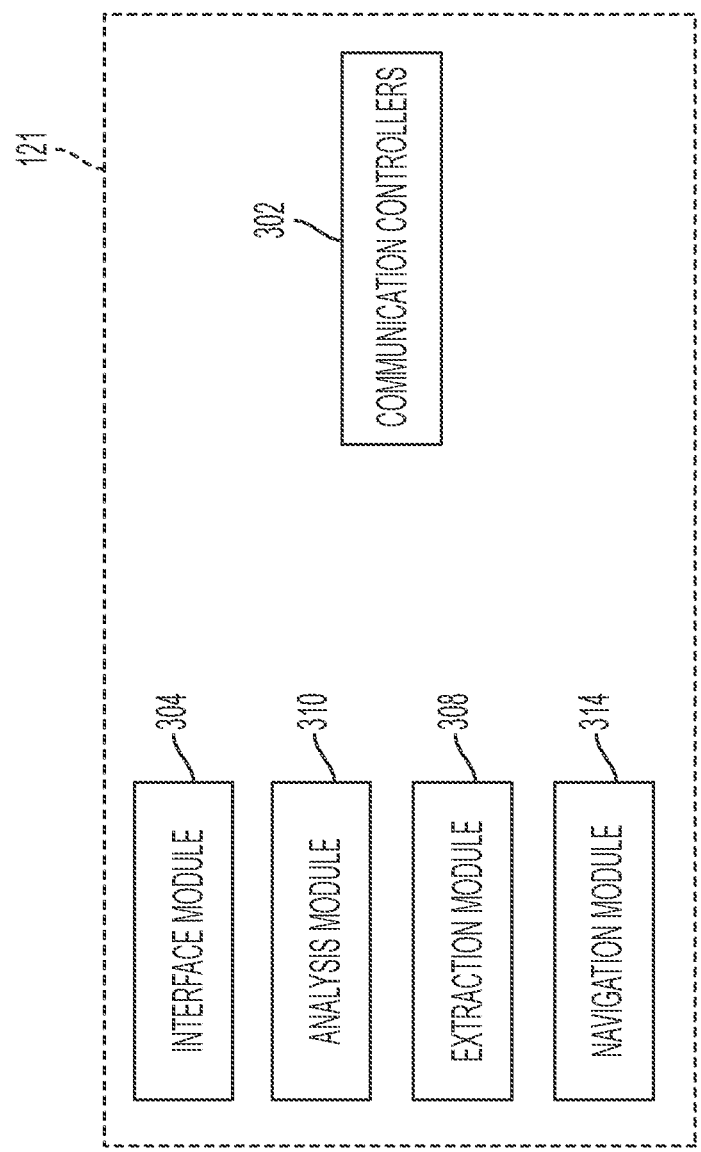
FIG. 3 illustrates an internal structural view of the self-learning software code/hardware structure of FIG. 1, in accordance with embodiments of the present invention.

FIG. 3 illustrates an internal structural view of self-learning software code/hardware structure 121 of FIG. 1, in accordance with embodiments of the present invention. Self-learning software code/hardware structure 121 includes an interface module 304, an analysis module 310, an extraction module 308, a navigation module 314, and communication controllers 302. Interface module 304 comprises specialized hardware and software for controlling all functions for generating an interface for executing the algorithm of FIG. 2. Analysis module 310 comprises specialized hardware and software for controlling all functionality related to execution of step 200 of FIG. 2. Extraction module 308 comprises specialized hardware and software for controlling all functionality related to execution of steps 202 and 204 of the algorithm of FIG. 2. Navigation module 314 module 314 comprises specialized hardware and software for executing step 218 (e.g., firmware, sensors, circuitry, etc.) and software of step 218 of FIG. 1. Communication controllers 302 are enabled for controlling all communications between interface module 304, analysis module 310, extraction module 308, and navigation module 314.

Figure 4:
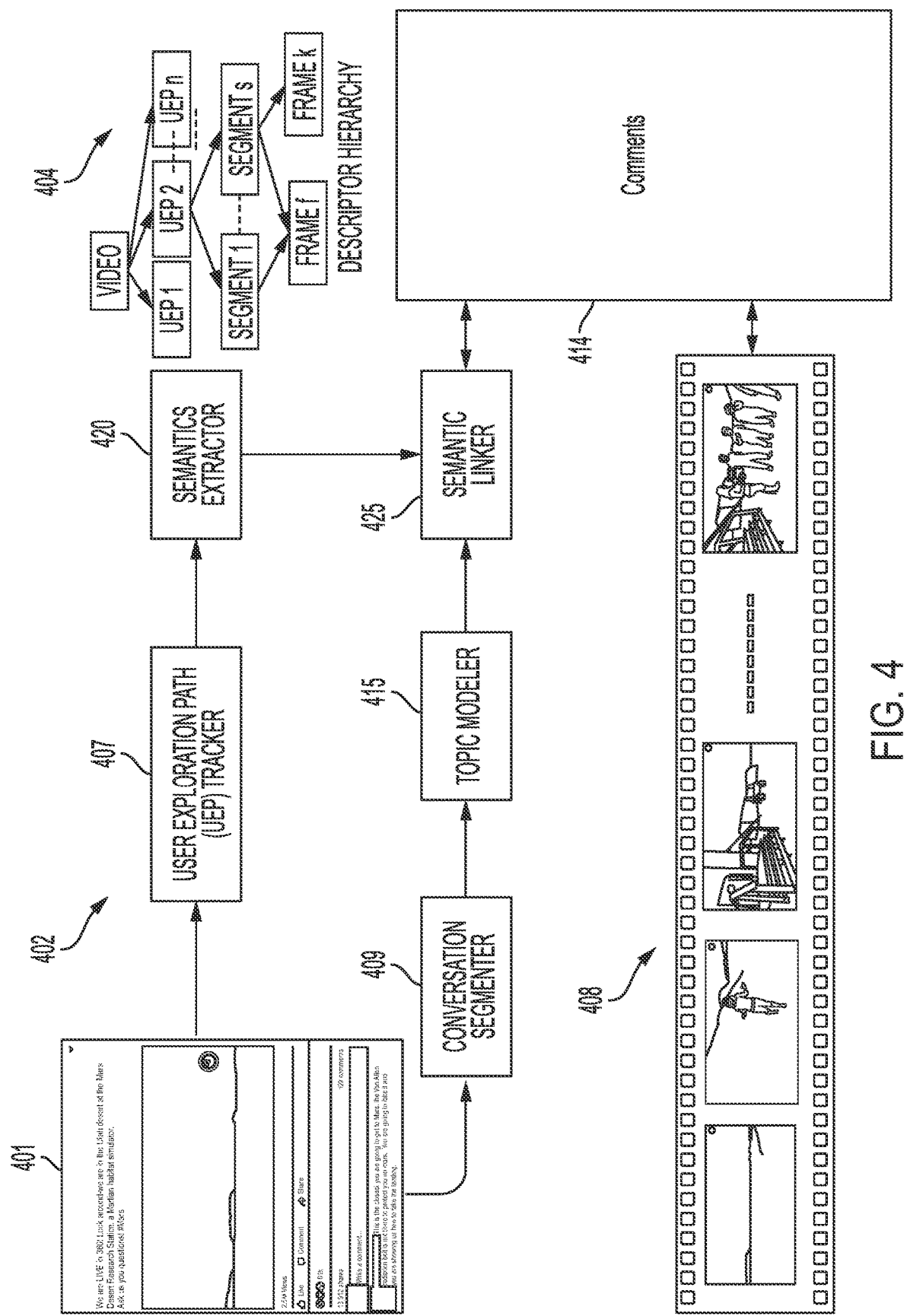
FIG. 4 illustrates a component level process flow, a descriptor hierarchy, video frames, and comments for improving video technology, in accordance with embodiments of the present invention.

FIG. 4 illustrates a component level process flow 402, a descriptor hierarchy 404, video frames 408, and comments 414 for improving video technology associated with extracting hot spot video frames, assigning viewing attributes to the hyper video space, and automatically navigating the hyper video space, in accordance with embodiments of the present invention. Component level process flow 402 includes a 360-degree video file 401 being inputted into a user exploration path (UEP) tracker component 407 and a conversation segmenter component 409. User exploration path (UEP) tracker component 407 processes the 360-degree video and semantics extractor 420 extracts semantics for a semantics linker component 425. Likewise, conversation segmenter component 409 processes the 360-degree video and a topic modeler component 415 determines topics for semantics linker component 425. Semantics linker component 425 transfers all analyzed information to a comments component 415 for processing with respect to a descriptor hierarchy 404 and video frames 408. Semantics extractor 420 and semantics linker component 425 are configured to generate descriptor hierarchy 404 via execution of the following features frame level features, segment level features, and UEP level features.

Frame level features are configured to sample key frames from UEP tracker component 407. The frame level features are extracted by applying dense captioning techniques. Segment level features are configured to sample all frames fitting a viewport in combination with UEP tracker component 407. Likewise, the sampled frames are aggregated into a video UEP segment. Additionally, a video UEP segment is temporally segmented using video segmentation techniques. Auto comment generation techniques are applied to each of the video segments. UEP level features are generated by sampling all video frames fitting a viewport in combination with a UEP. All captions and comments generated are tokenized and topics are identified. Descriptor hierarchy 404 is generated by creating a hierarchy of video, UEPs, segments of UEPs, and video frames. Topics are associated to each layer and node.

Figure 5:
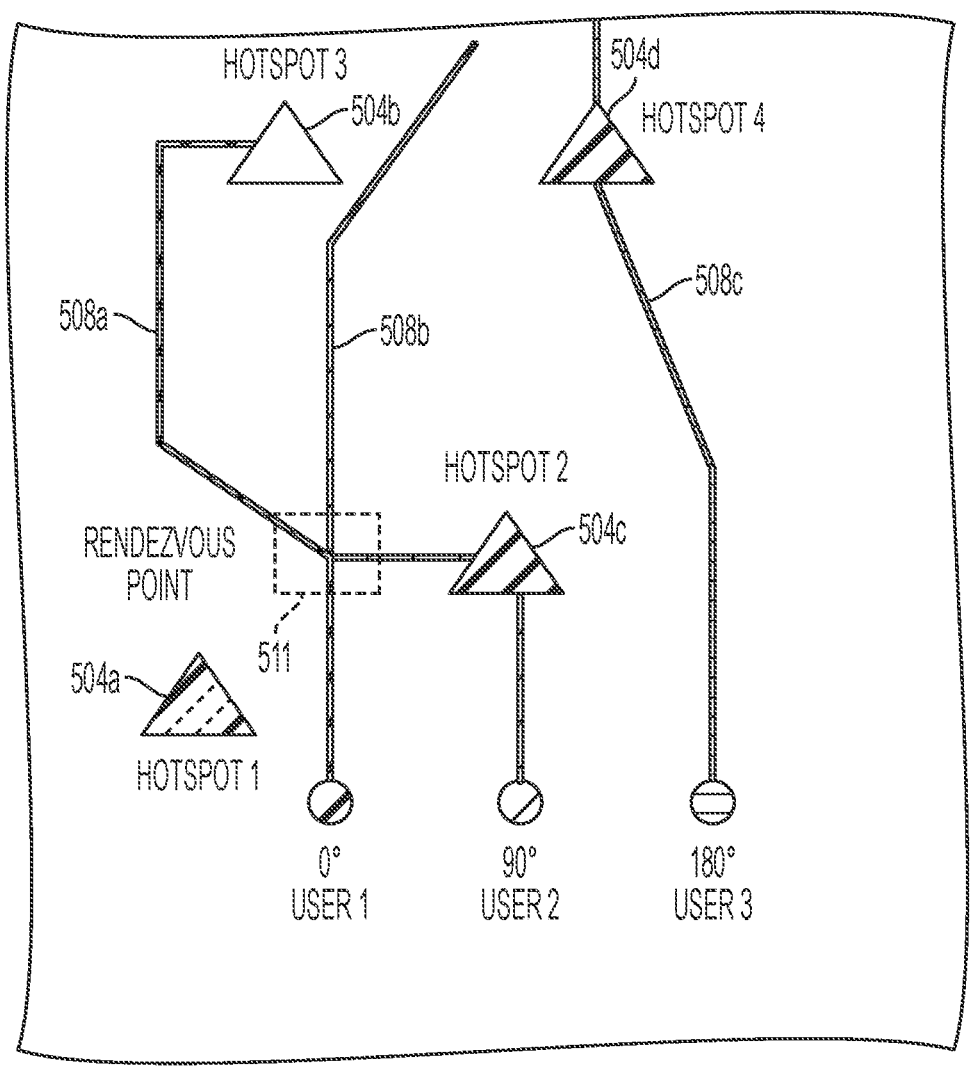
FIG. 5 illustrates process steps for navigating hyper videos, in accordance with embodiments of the present invention.

FIG. 5 illustrates process steps for navigating hyper videos, in accordance with embodiments of the present invention. The process is initiated when a UEP tracker component tracks the user interactions including tracking gestures (e.g., rotating or moving a device, mouse, keyboard, etc.) within a video space. The UEP tracker component constructs a user exploration path structure 502 by determining a distance and orientation of the user's movement within the video space with respect to an initial start position within the video space. Additional features such as dwell time may be included within the user exploration path structure 502.

Hotspots 504a . . . 504d (e.g., video hotspots) within hyper videos are initially enabled and user exploration paths 508a . . . 508c may be associated with hotpots 504a . . . 504d. A rendezvous point 511 are associated with simultaneous conversations related to multiple users watching a video. Rendezvous point 511 may be annotated on the UEP tracker component.

Conversation segmenter 408 (of FIG. 4) is configured to segment conversation flow according to semantics of content. Additionally, topic modeler component 415 (of FIG. 4) retrieves a list of curated topics mined from public information sources. Topic modeler component 415 labels conversation messages based on the focus topics.

Figure 6:
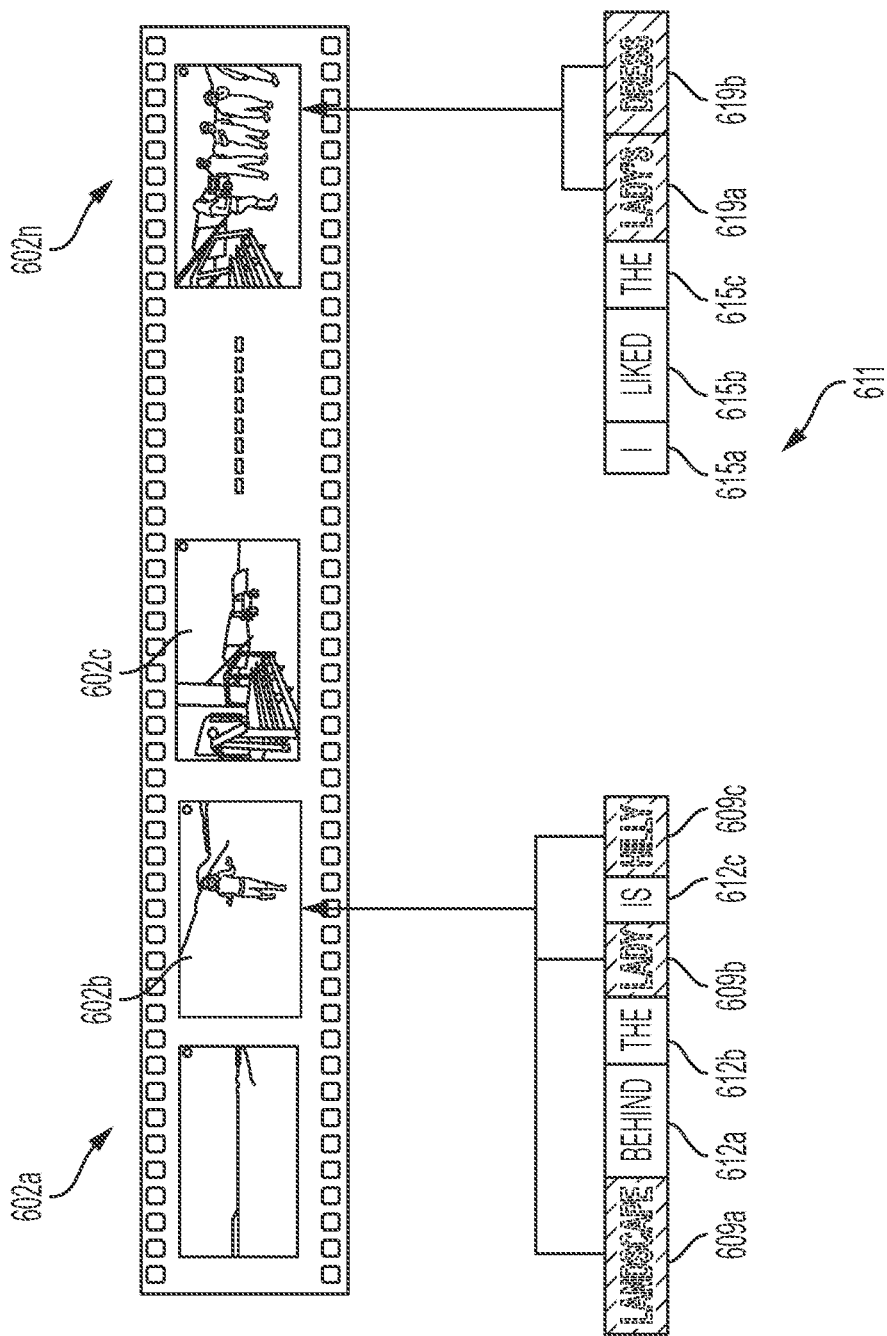
FIG. 6 illustrates a semantics linker component linking the descriptor hierarchy of FIG. 4 of a hyper video file with topics of conversations, in accordance with embodiments of the present invention.

FIG. 6 illustrates semantics linker component 425 linking descriptor hierarchy 404 of FIG. 4 of a hyper video file 602 with topics of conversations, in accordance with embodiments of the present invention. Links are assigned to words 611 in a conversation message as follows:

A neural embedding process is executed with respect to training documents comprising references to topics from the conversations and descriptor hierarchy 404 of FIG. 4. Likewise, topics within the conversation are assigned a link to a highest possible node in the descriptor hierarchy 404 that is closest to words detected in the neural embedding process. Therefore, when a user clicks on a word-link, a corresponding video segment 602a . . . 602n is played/rendered. For example, terms 609a, 609b, and 609c comprise conversational terms associated with descriptions for video segment 602b and therefore comprise correct terminology for analysis to determine specified view personas. Likewise, terms 612a and 612b are filtered out from conversations as these terms are unrelated to video segment 602b. Additionally, terms 619a, and 619b comprise conversational terms associated with descriptions for video segment 602n and therefore comprise correct terminology for analysis to determine specified view personas. Likewise, terms 615a . . . 615c are filtered out from conversations as these terms are unrelated to video segment 602n.

Figure 7:
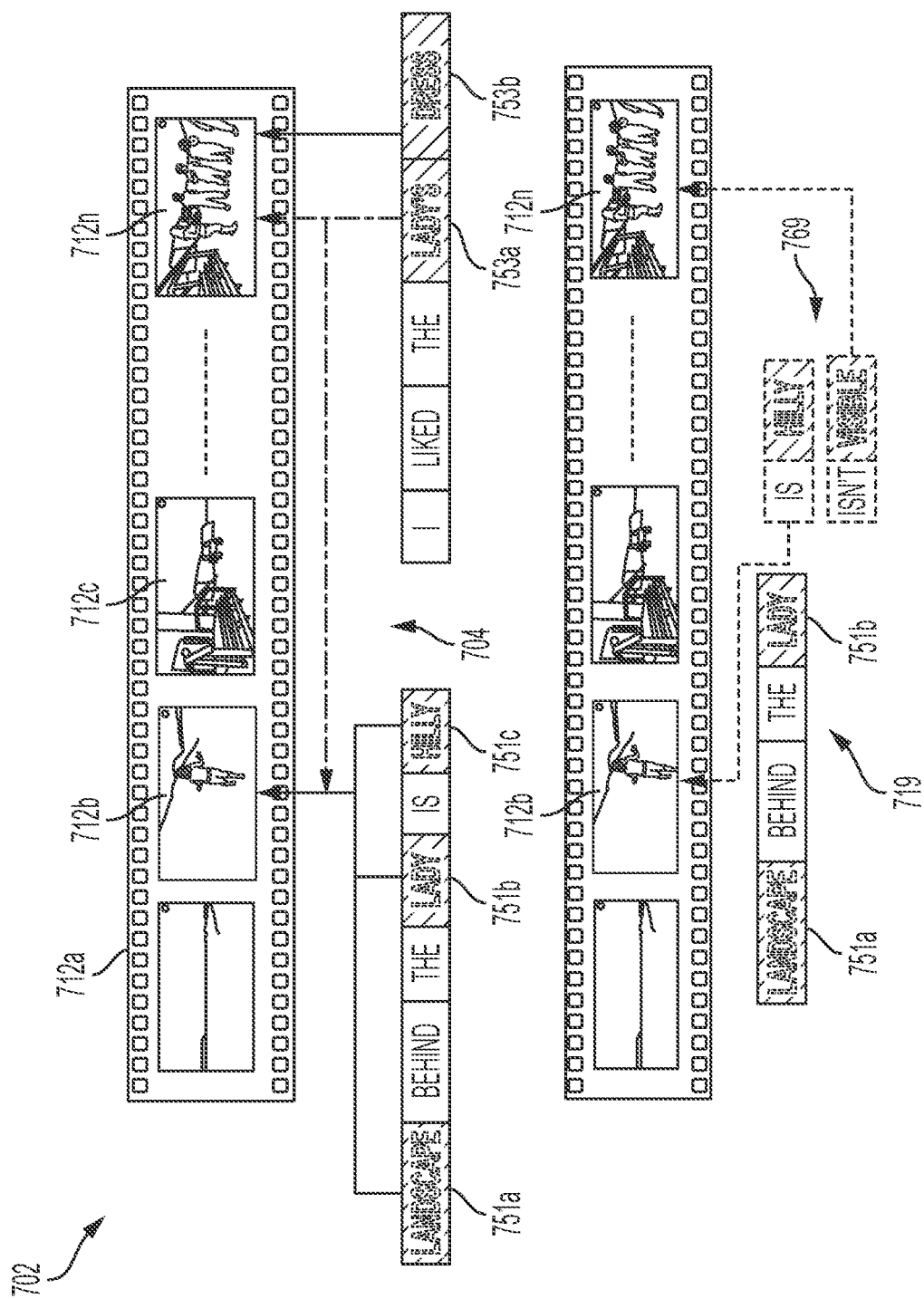
FIG. 7 illustrates the semantics linker component of FIG. 4 configured to generate overloading links and recommending link phrases, in accordance with embodiments of the present invention.

FIG. 7 illustrates semantics linker component 425 of FIG. 4 configured to generate overloading links and recommending link phrases, in accordance with embodiments of the present invention. Video portion 702 comprises video frames 712a . . . 712n. Overloading links enable descriptive terms 751a, 751b, and 751c for video frame 712b and descriptive terms 753a and 753b for video frame 712n for connecting to multiple frames/segments/UEP such that the links are overloaded with descriptive semantics. The links are ranked by relevance and a user may select from a list to navigate a video. Recommending link phrases enable conversational messages for training using publicly available media text or media content via usage of pro-active IR techniques for preparing a predicted list of words 719. The predicted list of words 719 is pruned using a description hierarchy for a video such that a pruned list of words 769 is generated. The pruned list of words 769 is additionally displayed to the user for selection.

Figure 8:
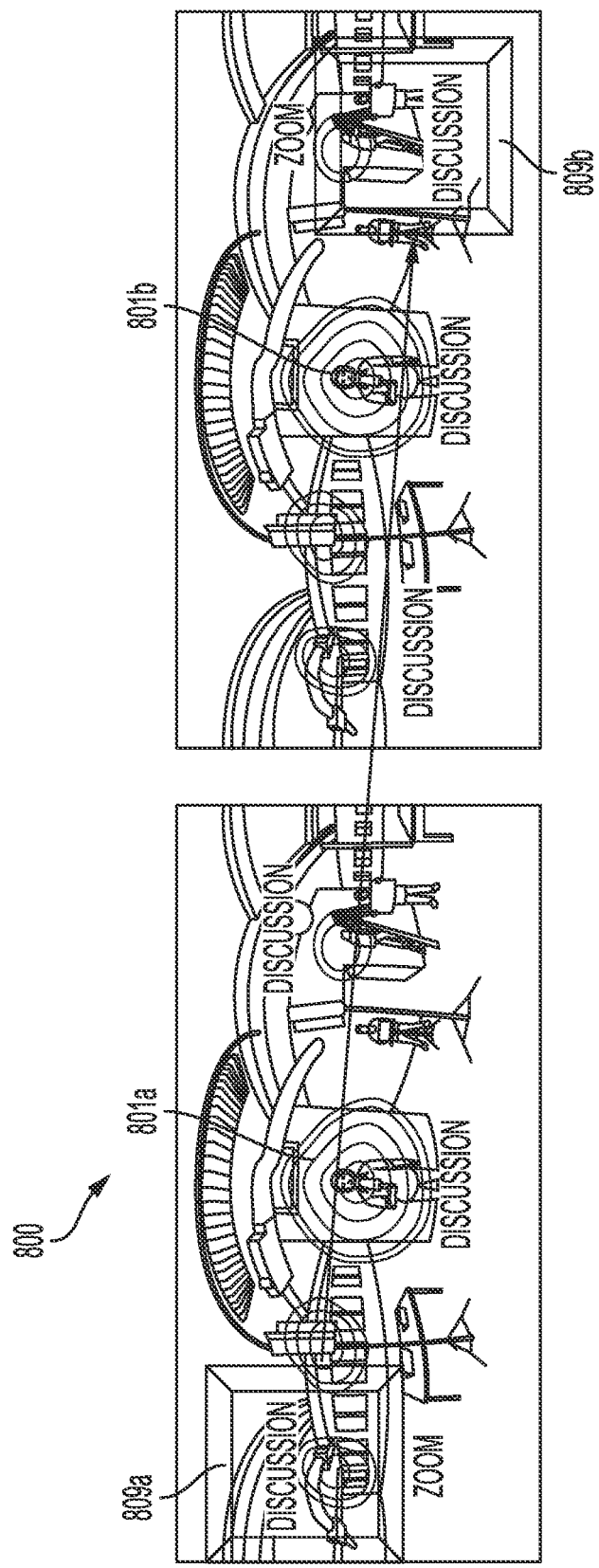
FIG. 8 illustrates a process and system for mapping video hotspots in hyper video frames to conversational discussion topics, in accordance with embodiments of the present invention.

FIG. 8 illustrates a process and system for mapping video hotspots in hyper video frames to conversational discussion topics, in accordance with embodiments of the present invention. The process is initiated when each discovered hotspot in a hyper-video is tagged with various discussion topics. Additionally, video view discussions 801a and 801b are determined based on tagged video hotspots and associated correlation across the video file. The system discovers and tags discussion topic features to all video hotspots in all video frames. Likewise, top-K common themes across all discovered discussion topic features in various video frames are extracted by extracting similar features across discovered video hotspot associated conversations. Subsequently (for every theme), a trajectory path covering all frames in the hyper-video is generated and based on discovered themes, various user-friendly persona names are assigned. Therefore, when a user enables a video, he/she receives a persona suggestion for assignment for automated navigation within the hyper-video. For example, a theme "fun" is extracted and a discussion 809a is related to the theme "fun" then a video auto focus module zooms into discussion 809a and discussion 809b (i.e., discussion 809a and 809b are each associated with the theme "fun") in various time-frames in association with the video view personas.

Figure 9:
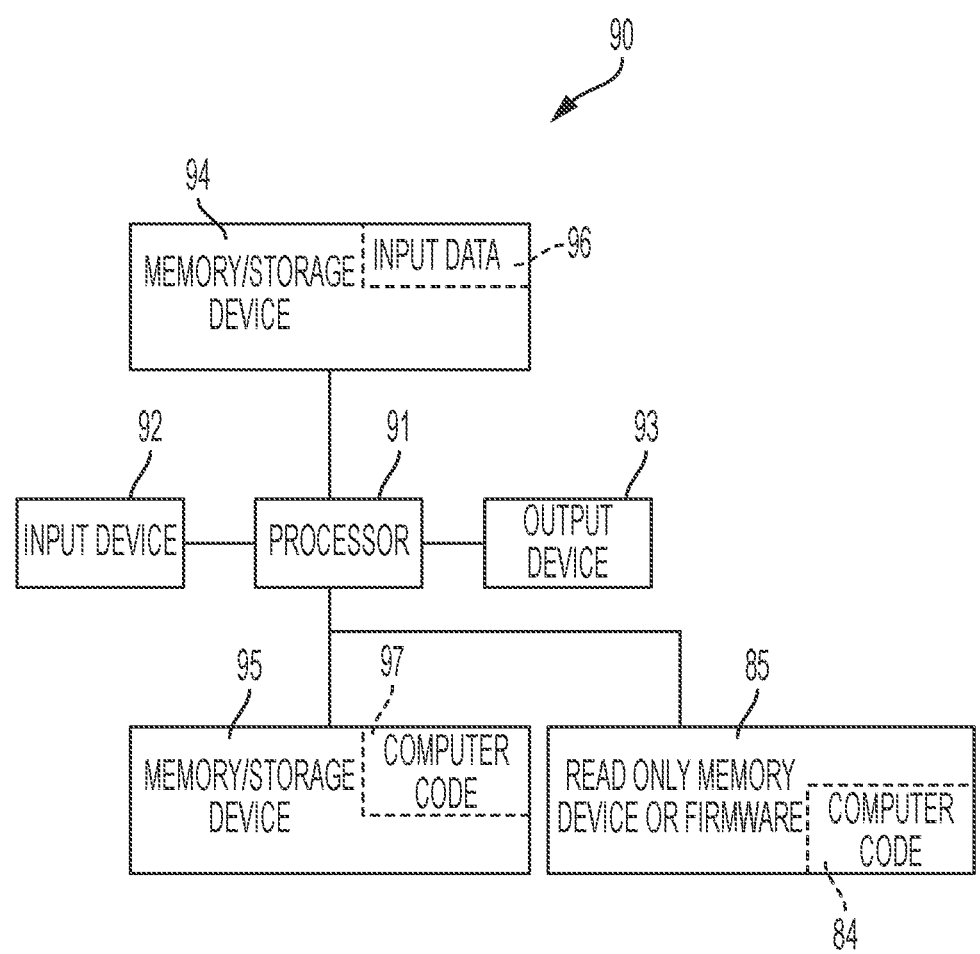
FIG. 9 illustrates a computer system used by the system of FIG. 1 for improving video technology associated with extracting hot spot video frames, assigning viewing attributes to the hyper video space, and automatically navigating the hyper video space, in accordance with embodiments of the present invention.

FIG. 9 illustrates a computer system 90 (e.g., hardware devices 105a . . . 105n and/or server hardware device 104 of FIG. 1) used by or comprised by the system of FIG. 1 for improving video technology associated with extracting hot spot video frames, assigning viewing attributes to the hyper video space, and automatically navigating the hyper video space, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 9 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for improving video technology associated with extracting hot spot video frames, assigning viewing attributes to the hyper video space. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM)

device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve video technology associated with extracting hot spot video frames, assigning viewing attributes to the hyper video space, and automatically navigating the hyper video space. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving video technology associated with extracting hot spot video frames, assigning viewing attributes to the hyper video space, and automatically navigating the hyper video space. In another embodiment, the invention provides a business method that performs the process steps of the invention on a subscription, advertising, and/or fee basis. That is, a service supplier, such as a Solution Integrator, could offer to enable a process for improving video technology associated with extracting hot spot video frames, assigning viewing attributes to the hyper video space, and automatically navigating the hyper video space. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 9 shows the computer system 90 as a particular configuration of hardware and software, any configuration of hardware and software, as would be known to a person of ordinary skill in the art, may be utilized for the purposes stated supra in conjunction with the particular computer system 90 of FIG. 9. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
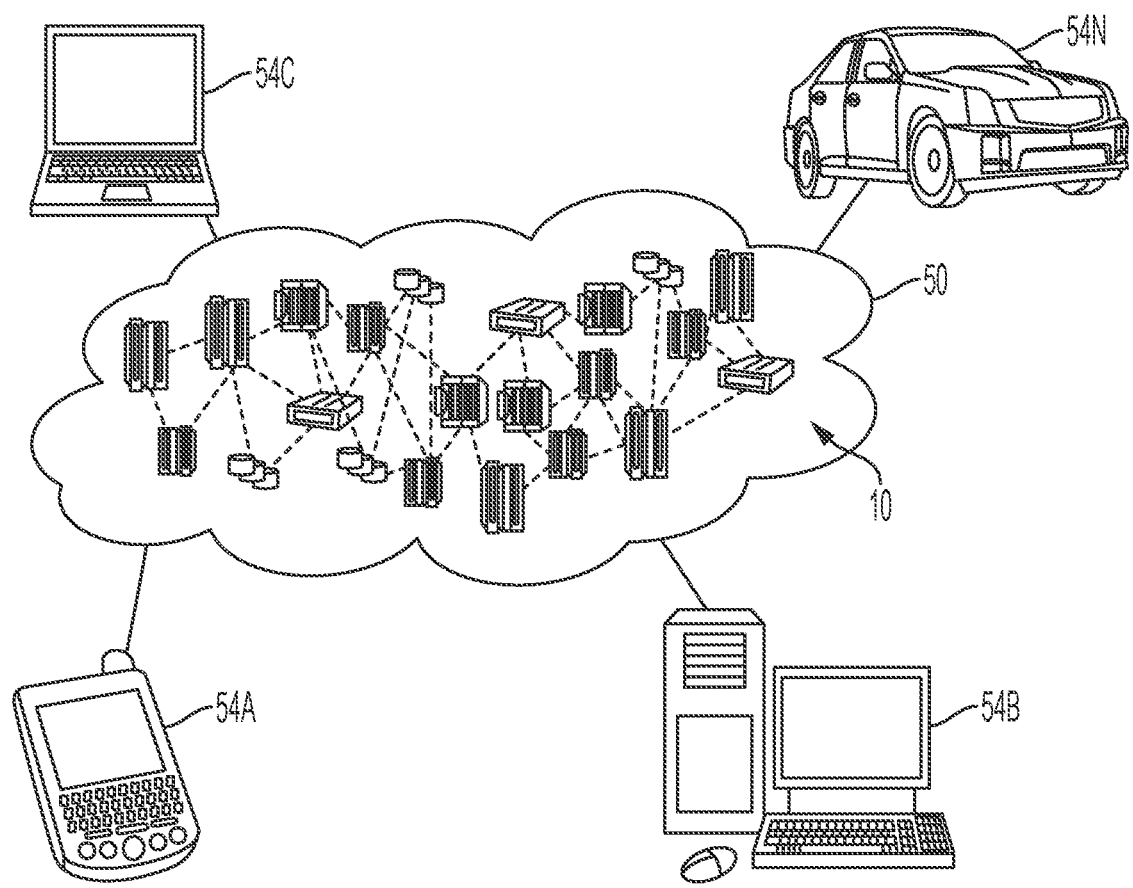
FIG. 10 illustrates a cloud computing environment, in accordance with embodiments of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 10 are intended to be illustrative only and that computing nodes 10 and cloud computing environment 50 can communicate with any type of computerized device over any type of network and/or network addressable connection (e.g., using a web browser).

Figure 11:
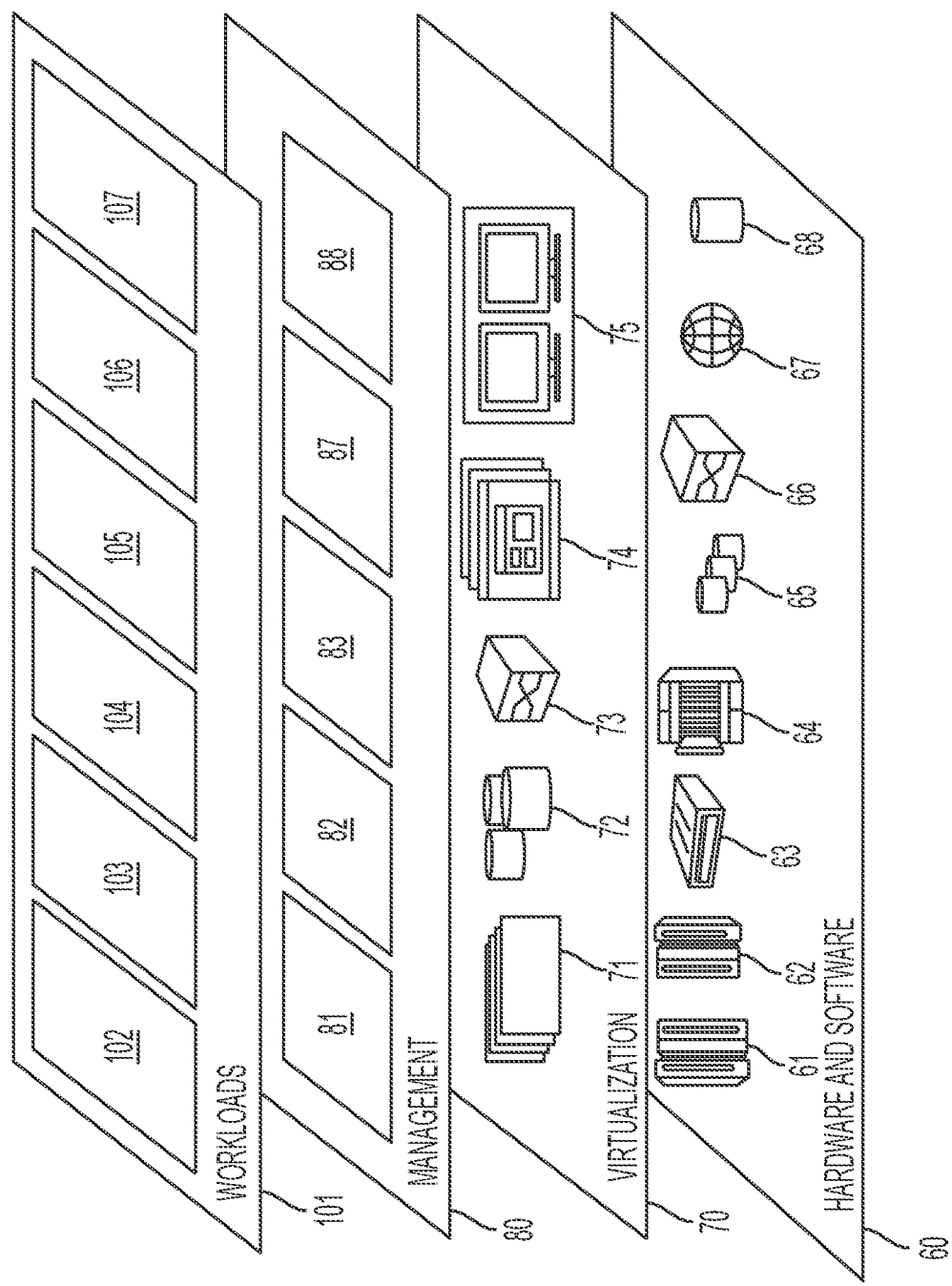
FIG. 11 illustrates a set of functional abstraction layers provided by cloud computing environment, in accordance with embodiments of the present invention.

Referring now to FIG. 11, a set of functional abstraction layers provided by cloud computing environment 50 (see FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 104; data analytics processing 105; transaction processing 106; and for improving video technology associated with extracting hot spot video frames, assigning viewing attributes to the hyper video space, and automatically navigating the hyper video space 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A hyper-video navigational method comprising:
automatically tracking, by a processor of a hardware device, a plurality of user exploration paths of a plurality of users within a hyper video space comprising a video stream;
extracting, by said processor from said hyper video space, hotspot video frames, of said video stream, based on user interactions of the plurality of users with said hyper video space;
linking, by said processor, conversations associated with said user interactions with spatial temporal regions of said hotspot video frames;
extracting, by said processor, themes across discovered discussion topic features by extracting features of said discussion topic features across conversations of said video hotspot frames;
detecting, by said processor based on said themes, a plurality of specified user view personas of users of said video stream with respect to said hotspot video frames;
extracting, by said processor, visual trajectory paths for each specified user view persona of said plurality of specified user view personas, wherein each said specified user view persona is associated with a group of hotspot video frames of said hotspot video frames;
automatically assigning, by said processor, a particular specified user view persona of said plurality of specified user view personas to a particular user of said hyper video space; and
automatically navigating, by said processor in response to said automatically assigning, said hyper video space for said particular user.

2. The method of claim 1, wherein said user interactions comprise device movement gestures, and input/output events with respect to said hyper video space.

3. The method of claim 1, wherein said user exploration paths are generated by determining a distance and orientation of movement of said user within said hyper video space with respect to a starting position of said video stream.

4. The method of claim 1, further comprising:
tagging, by said processor, said hotspot video frames with specified video stream topics.

5. The method of claim 1, further comprising:
generating, by said processor based on results of said automatically navigating, self-learning software code for executing future hyper video navigational processes; and
modifying, by said processor based on said results of said future hyper video navigational processes, said self-learning software code.

6. The method of claim 1, further comprising:
providing at least one support service for at least one of creating, integrating, hosting, maintaining, and deploying computer-readable code in the control hardware, said code being executed by the computer processor to implement: said automatically tracking, said extracting said hotspot video frames, said linking, said detecting, said extracting said visual trajectory paths, said automatically assigning, and said automatically navigating.

7. The method of claim 1, further comprising:
extracting, by said processor, descriptive semantics associated with said hotspot video frames; and
organizing, by said processor, said descriptive semantics with respect to a hierarchy of concepts with respect to said video stream.

8. The method of claim 7, wherein said extracting said descriptive semantics comprises:
sampling, key frames of said user exploration paths;
extracting key features of said key frames resulting in generation of frame level features of first captions and comments;
sampling, frames associated with a viewport of said user exploration paths;
aggregating, said frames into a video user exploration path segment;
temporally segment, said video user exploration path segment;
applying, user comments to said video user exploration path segment resulting in generation of segment level features of second captions and comments and user exploration path features of third captions and comments;
tokenizing, said first captions and comments, said second captions and comments, said third captions and comments for topic identification;
generating based on said descriptive semantics, a description hierarchy comprising said key frames, said frames, said video user exploration path segment, and said auto comments; and
associating, said first captions and comments, said second captions and comments, and said third captions and comments with each layer and node of said description hierarchy.

9. The method of claim 7, further comprising:
segmenting, by said processor, said conversations with respect to said descriptive semantics.

10. The method of claim 7, further comprising:
linking, by said processor, said hierarchy of concepts with said conversations such that links are generated for automatically rendering a specified video segment of said video stream.

11. The method of claim 7, further comprising:
linking, by said processor, said hierarchy of concepts with said conversations such that links are generated for automatically rendering specified video segments of said video stream.

12. A computer program product, comprising a computer readable hardware storage device storing a computer readable program code, said computer readable program code comprising an algorithm that when executed by a processor of a hardware device implements a hyper-video navigational method, said method comprising:
automatically tracking, by said processor, a plurality of user exploration paths of a plurality of users within a hyper video space comprising a video stream;
extracting, by said processor from said hyper video space, hotspot video frames, of said video stream, based on user interactions of the plurality of users with said hyper video space;
linking, by said processor, conversations associated with said user interactions with spatial temporal regions of said hotspot video frames;
extracting, by said processor, themes across discovered discussion topic features by extracting features of said discussion topic features across conversations of said video hotspot frames;
detecting, by said processor based on said based on said common themes, a plurality of specified user view personas of users of said video stream with respect to said hotspot video frames;
extracting, by said processor, visual trajectory paths for each specified user view persona of said plurality of specified user view personas, wherein each said specified user view persona is associated with a group of hotspot video frames of said hotspot video frames;
automatically assigning, by said processor, a particular specified user view persona of said plurality of specified user view personas to a particular user of said hyper video space; and
automatically navigating, by said processor in response to said automatically assigning, said hyper video space for said particular user.

13. The computer program product of claim 12, wherein said user interactions comprise device movement gestures, and input/output events with respect to said hyper video space.

14. The computer program product of claim 12, wherein said user exploration paths are generated by determining a distance and orientation of movement of said user within said hyper video space with respect to a starting position of said video stream.

15. The computer program product of claim 12, wherein said method further comprises:
extracting, by said processor, descriptive semantics associated with said hotspot video frames; and
organizing, by said processor, said descriptive semantics with respect to a hierarchy of concepts with respect to said video stream.

16. The computer program product of claim 15, wherein said extracting said paths, descriptive semantics comprises:
sampling, key frames of said user exploration paths;
extracting key features of said key frames resulting in generation of frame level features of first captions and comments;
sampling, frames associated with a viewport of said user exploration paths;
aggregating, said frames into a video user exploration path segment;
temporally segment, said video user exploration path segment;

applying, user comments to said video user exploration path segment resulting in generation of segment level features of second captions and comments and user exploration path features of third captions and comments;

tokenizing, said first captions and comments, said second captions and comments, and said third captions and comments for topic identification;

generating based on said descriptive semantics, a description hierarchy comprising said key frames, said frames, said video user exploration path segment, and said auto comments; and associating, said first captions and comments, said second captions and comments, and said third captions and comments with each layer and node of said description hierarchy.

17. The computer program product of claim 15, wherein said method further comprises:

segmenting, by said processor, said conversations with respect to said descriptive semantics.

18. The computer program product of claim 15, wherein said method further comprises:

linking, by said processor, said hierarchy of concepts with said conversations such that links are generated for automatically rendering a specified video segment of said video stream.

19. The computer program product of claim 15, wherein said method further comprises:

linking, by said processor, said hierarchy of concepts with said conversations such that links are generated for automatically rendering specified video segments of said video stream.

20. A hardware device comprising a processor coupled to a computer-readable memory unit, said memory unit comprising instructions that when executed by the computer processor implements a hyper-video navigational method comprising:

automatically tracking, by said processor, a plurality of user exploration paths of a plurality of users within a hyper video space comprising a video stream;

extracting, by said processor from said hyper video space, hotspot video frames, of said video stream, based on user interactions of the plurality of users with said hyper video space;

linking, by said processor, conversations associated with said user interactions with spatial temporal regions of said hotspot video frames;

extracting, by said processor, themes across discovered discussion topic features by extracting features of said discussion topic features across conversations of said video hotspot frames;

detecting, by said processor based on said themes, a plurality of specified user view personas of users of said video stream with respect to said hotspot video frames;

extracting, by said processor, visual trajectory paths for each specified user view persona of said plurality of specified user view personas, wherein each said specified user view persona is associated with a group of hotspot video frames of said hotspot video frames;

automatically assigning, by said processor, a particular specified user view persona of said plurality of specified user view personas to a particular user of said hyper video space; and automatically navigating, by said processor in response to said automatically assigning, said hyper video space for said particular user.

* * * * *